Dec. 18, 1945.    A. C. McKINLEY    2,391,326
PNEUMATIC FLOTATION GEAR
Filed Dec. 12, 1940    6 Sheets-Sheet 1
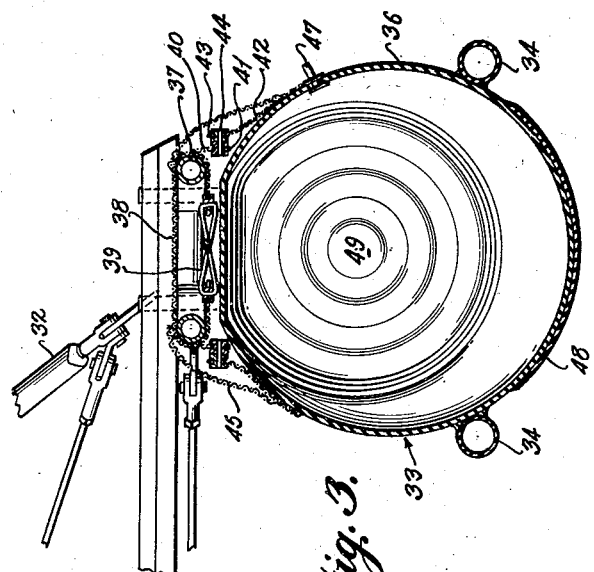
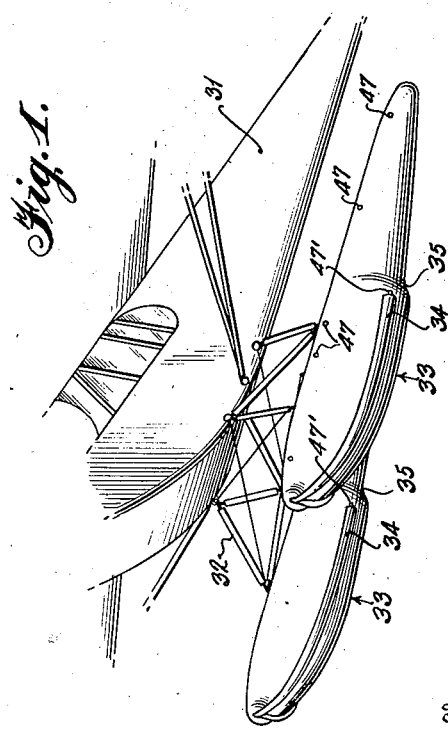
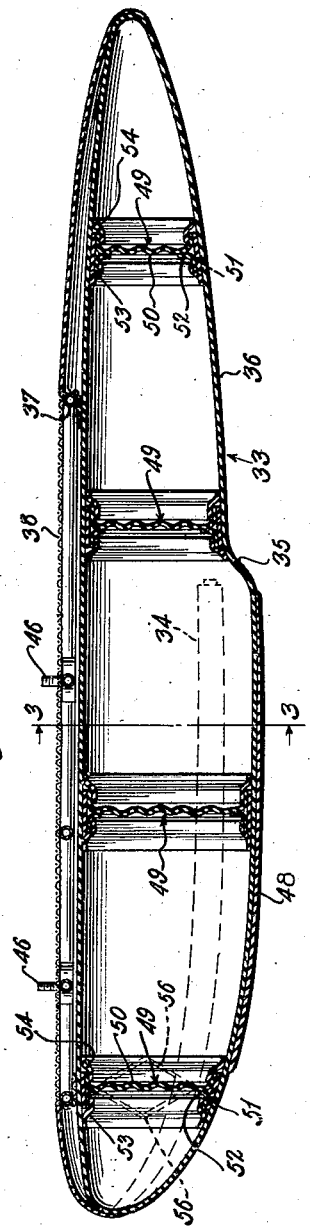
Inventor
Ashley C. McKinley
By Stevens and Davis
Attorneys Dec. 18, 1945.   A. C. McKINLEY   2,391,326
PNEUMATIC FLOTATION GEAR
Filed Dec. 12, 1940   6 Sheets-Sheet 2
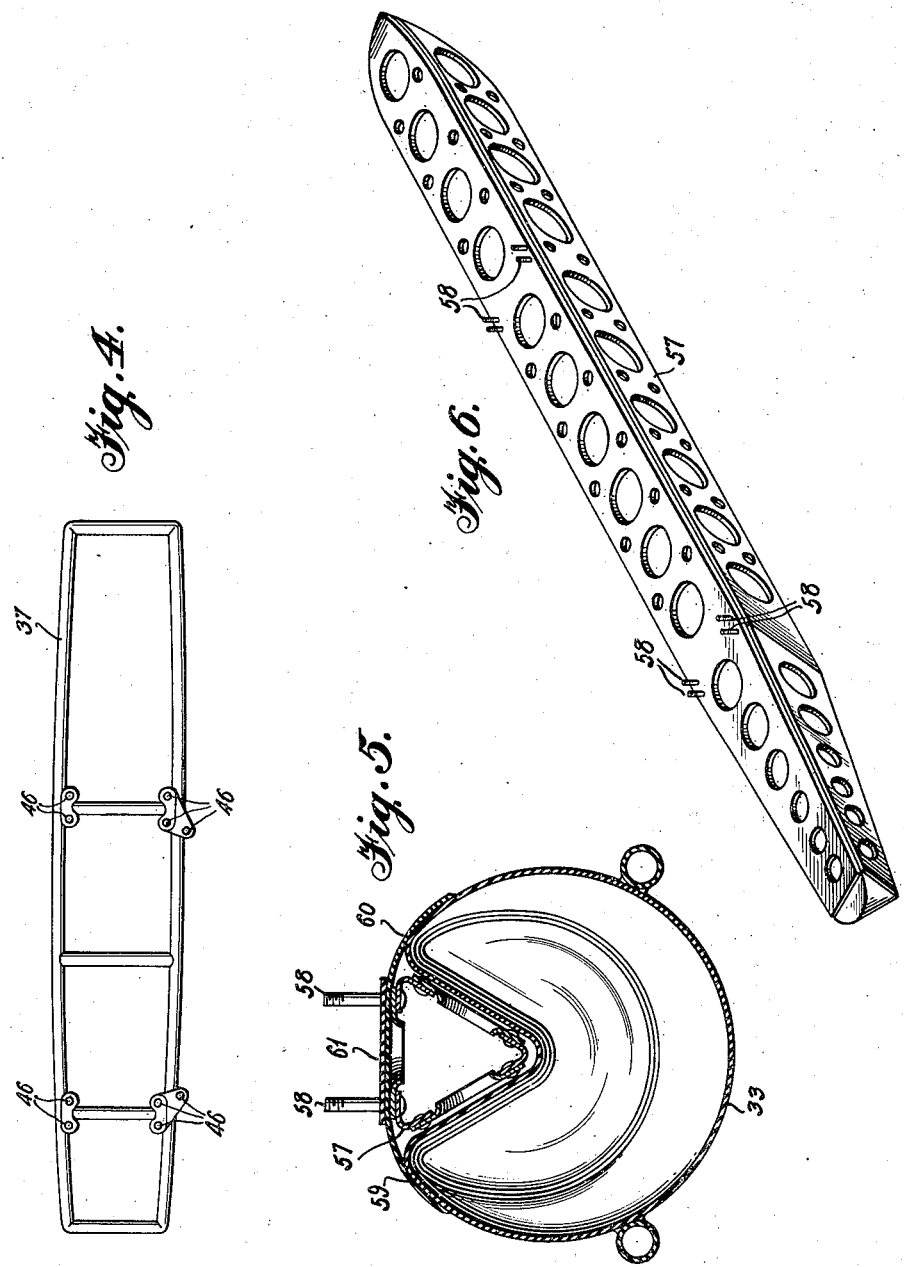
Inventor
Ashley C. McKinley
By Stevens and Davis
Attorneys Dec. 18, 1945. A. C. McKINLEY 2,391,326
PNEUMATIC FLOTATION GEAR
Filed Dec. 12, 1940 6 Sheets-Sheet 3
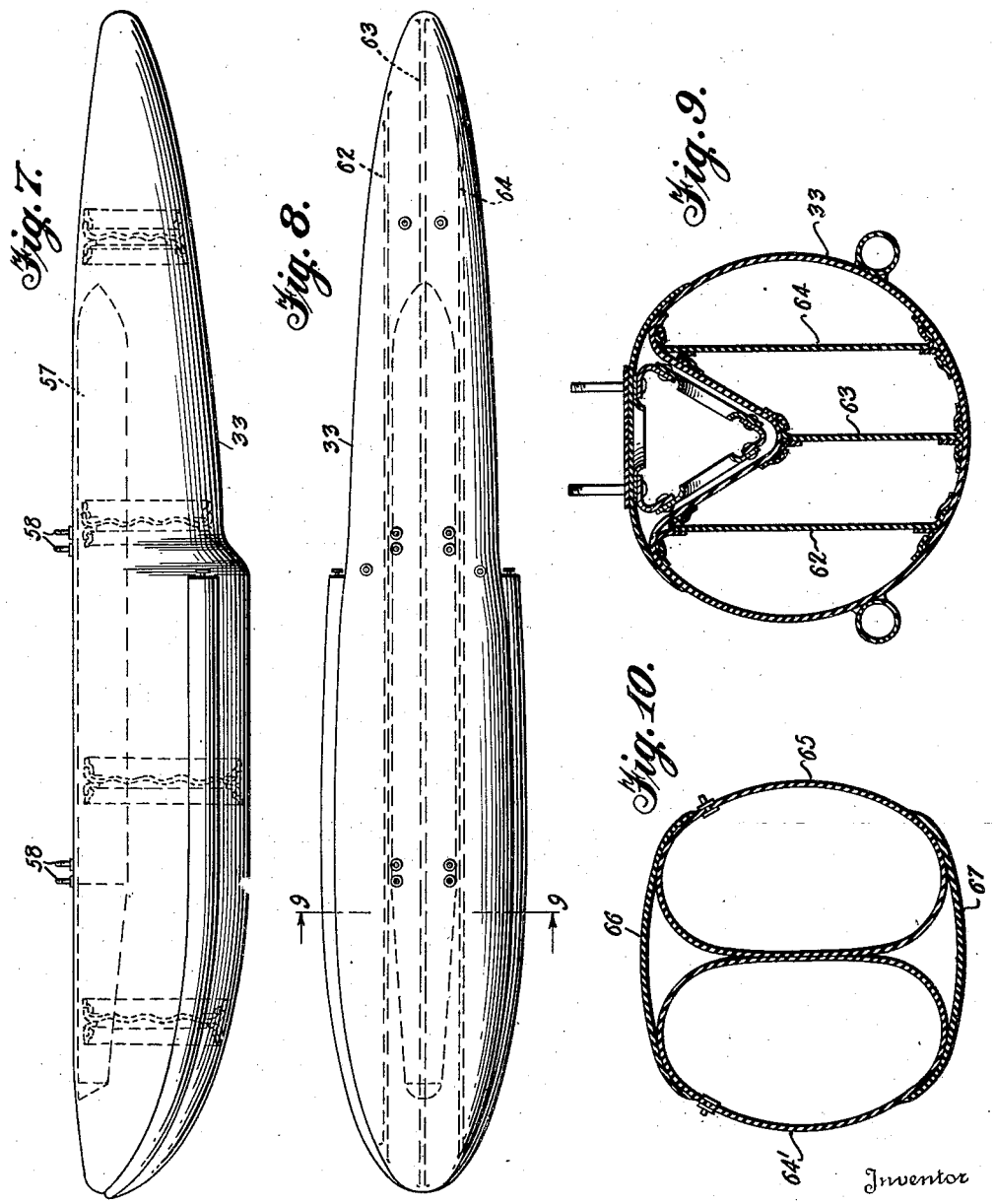
Inventor
Ashley C. McKinley
By Stevens and Davis
Attorneys

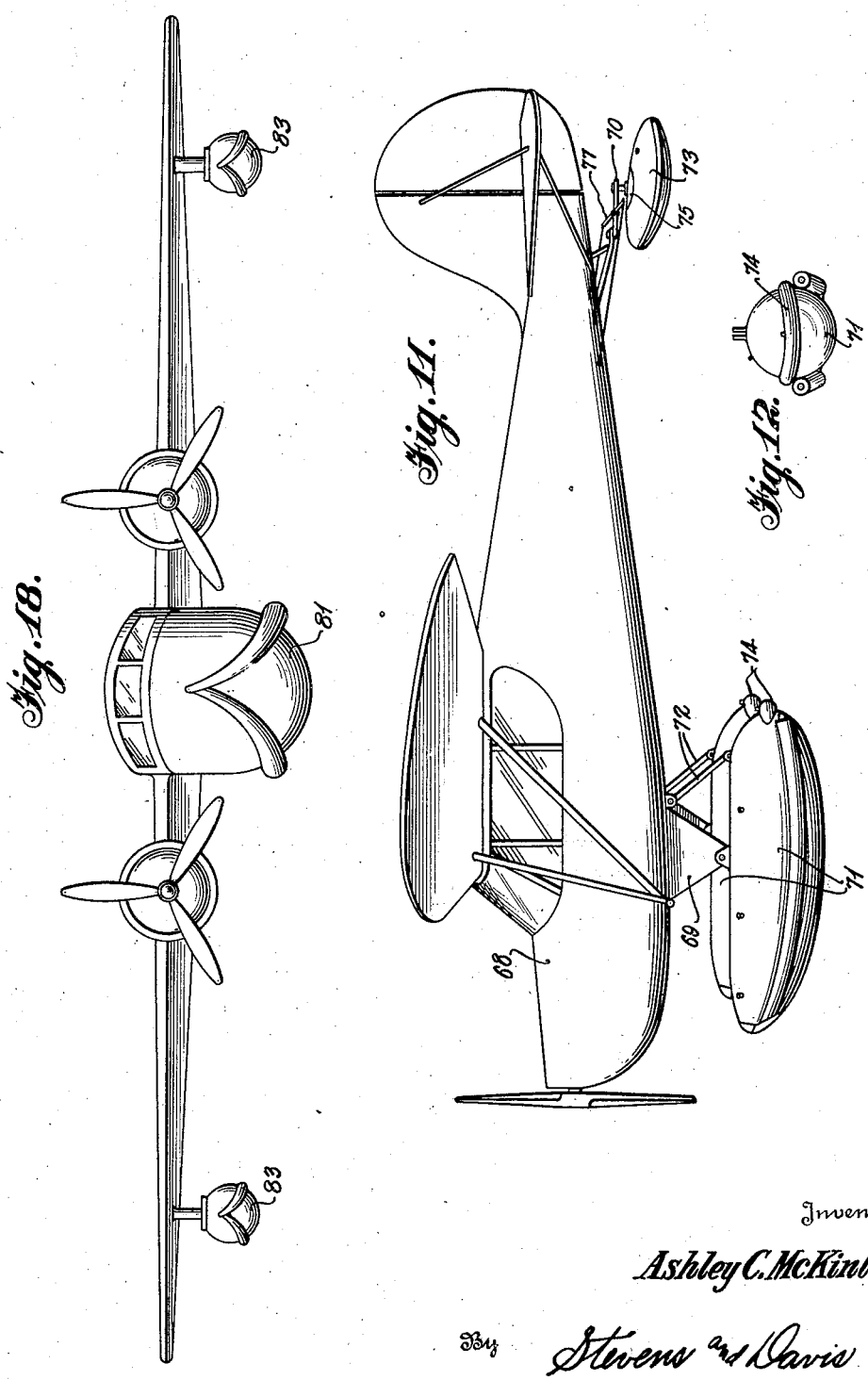

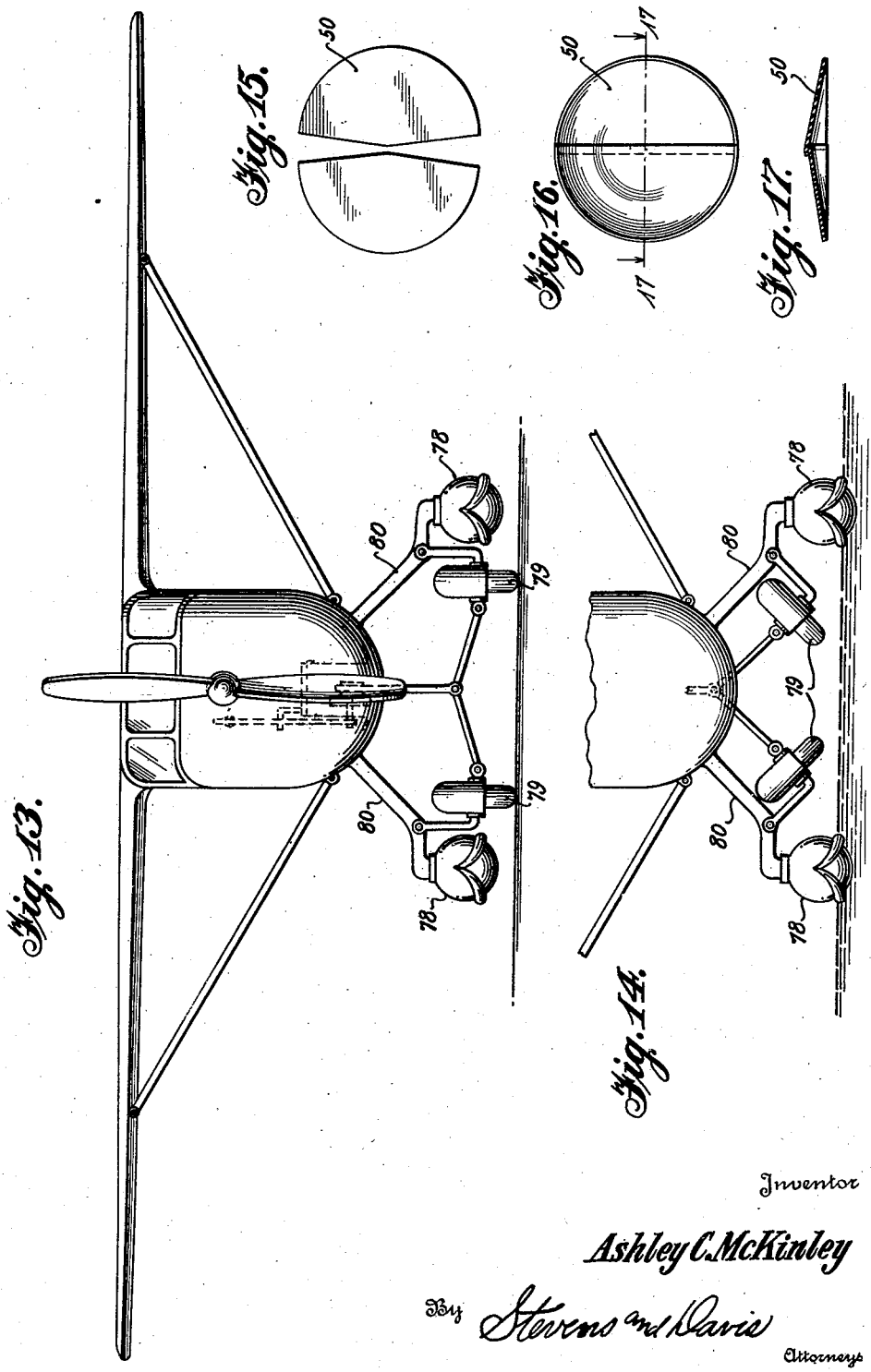

Dec. 18, 1945.  A. C. McKINLEY  2,391,326
PNEUMATIC FLOTATION GEAR
Filed Dec. 12, 1940   6 Sheets-Sheet 6
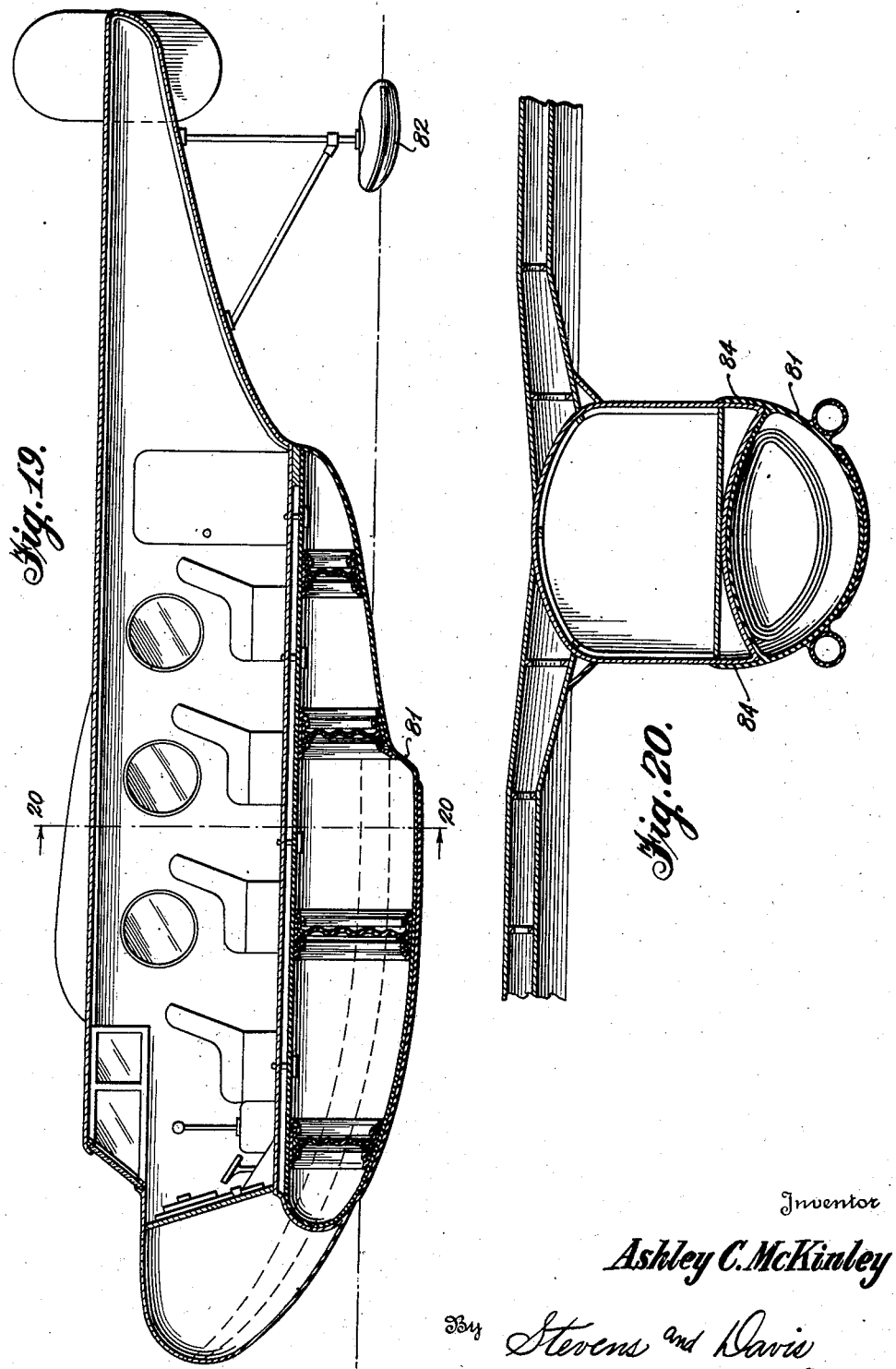
Inventor
Ashley C. McKinley
By Stevens and Davis
Attorneys Patented Dec. 18, 1945

2,391,326

UNITED STATES PATENT OFFICE 2,391,326

PNEUMATIC FLOTATION GEAR

Ashley C. McKinley, Huntington, N. Y., assignor to McKinley Pneumatic Floats, Inc., Garden City, Long Island, N. Y., a corporation of New York Application December 12, 1940, Serial No. 369,879

21 Claims. (Cl. 114—66.5)

This invention relates to airplanes capable of alighting on and arising from water and more particularly to flotation gear for such aircraft which flotation gear is of the pneumatic type.

Prior to this invention a number of types of aircraft that could alight on and arise from the water had been devised. These aircraft may be generally classified as hydroplanes, amphibians and flying boats. The flotation gear of each of these types of airplanes differed somewhat somewhat from that of the others but in every instance where the aircraft was of any commercial importance, the flotation gear was of a rigid type built either of metal or wood.

As a consequence of this type of construction, when the aircraft alight on water, particularly if the water is rough or if the landing is not perfect, there is a great beating of the water against the flotation gear and the noise and vibration that result are transmitted to every part of the ship. The same phenomenon is caused, usually to a somewhat lesser extent, by the take-off. This noise and vibration is not only uncomfortable to the pilot and disconcerting to the passengers but is definitely abusive to the structural parts of the aircraft itself and hence any method of avoiding or lessening this vibration is of great practical importance particularly in aircraft that take off and land at high speed from relatively rough water.

Several attempts have been made to overcome these difficulties by using less rigid flotation gear and some of the proposed flotation gears have been made of fabric stretched over a frame but none of these flotation gears have been very successful. Some of them, despite their fabric covering, were made so rigid by the framework used with the fabric that they did not absorb the shock incident to landing and take-off and furthermore, because the fabric was held rigidly they were susceptible to easy puncturing or other damage. Others where less framework was included simply failed to furnish adequate support for the aircraft or caused so much drag in the water that the aircraft was unable to take off efficiently.

According to the present invention a new kind of flotation gear is provided, which flotation gear is adaptable for use with any type of aircraft, and which flotation gear is sufficiently resilient to absorb much of the shock attendant to landing and take-off and yet which flotation gear is not only much more difficult to injure by striking than are the older types of flotation gears but which is also lighter and much more efficient for take-off, landing and taxying purposes than any of the previously known floats have been.

The new float may be broadly stated to operate on the same principle as the rubber tire on an automobile. It comprises an inflatable float member the bottom of which rests on water when the aircraft is not flying and the aircraft is supported from the top of this inflatable member. Thus, the shocks which are caused by rough contact between the bottom of the inflatable member and the water are to a large extent absorbed in the inflatable member itself instead of being transmitted to the aircraft. There are no rigid members extending from the top to the bottom of the float to prevent this cushioning effect. The absence of any rigid members extending to the bottom of the float has the additional advantage of permitting the float to give if it strikes a hard sharp object and thus prevents it from being easily punctured.

This construction may at first seem simple and obvious but the absence of rigid members extending to the bottom of the float also limits the ability of the makers to shape the float, that is to make it have a flat or V-shaped bottom as is common with rigid floats and hence makes necessary some means for reducing the drag of the float in the water, for a simple round bottomed float produces so much drag in the water that it is practically impossible to get the aircraft to make enough speed to start flying within any reasonable distance.

This latter difficulty has been overcome in the present flotation gear by providing a deflecting ridge on the outer surface of each float, extending in a generally horizontal direction around the float in such a position that the water which is forced out from under the float when the aircraft is in motion is deflected outwardly and downwardly by this deflecting ridge. The force of the water on the deflecting ridge thus acts to lift the ship and at the same time to stretch the bottom of the float from its normally arcuate contour into a shape that is more nearly flat. Thus, as the aircraft picks up speed the bottom of the float becomes more nearly flat and the water that is thrown sideways from the float contributes by its force against the deflecting ridge to the lifting of the ship higher on the water. Furthermore, the bottom of the float being of fabric not only is flexible so that it helps to cushion the impact of the water against the ship but also, being flexible, it tends to oscillate sufficiently to prevent a suction between the surface and the water. This suction, with rigid floats, often keeps the ship from being able to take off easily.

The new flotation gear may be used on hydroplanes directly in place of the two rigid floats that are commonly used and may be of substantially the same shape as the rigid floats now in use. It may also be used on hydroplanes in place of the two floats now commonly used but with the difference that the new float does not need to have a step as is common in rigid floats for the new float eliminates the suction problem that made the step necessary on rigid floats.

Alternatively, these floats may be used in place of wheels and a tail wheel on a conventional land type airplane, thus making it a hydroplane. The new floats have been found to work very well for this purpose if the floats replacing the front wheels are shortened somewhat and a small float substituted for the tail wheel. The small floats can even be made steerable like a steerable tail wheel to facilitate taxying.

The new floats may also be used in an amphibian type of flotation gear being arranged to be permanently positioned while the wheels of the aircraft are either raised or lowered depending upon whether the ship is to descend on land or water. Alternatively the floats can be arranged to be raised or lowered instead of the wheels, or the arrangement can be such that both the wheels and the floats move. If the floats are to be raised into a recess in the ship, it may be found desirable to deflate the floats so that they will occupy smaller space, or the floats may even be deflated without being raised or lowered, so as to present less air resistance.

On flying boats a float of the type described may be used as the boat hull or suspended immediately below the boat hull and in this case as in the others the float may be deflated while the aircraft is in flight to lessen wind resistance.

The floats may, in fact, be used on any type of aircraft, whatever, including even blimps, dirigibles, free ballons, Autogiros, and helicopters.

The floats will customarily be made with a series of compartments in them so that the puncturing of one compartment will not deflate the float to an extent sufficient to endanger the aircraft and in the case of large aircraft it is sometimes desirable to make several long narrow floats and then bind them together in a single large float. The compartments in any instance may be either longitudinal or transverse.

The floats thus far manufactured have been manufactured from rubberized fabric similar to that used in pneumatic life rafts using two plies with the threads lying at right angles to each other so that the fabric will not stretch. A heavy rubber strip has been found desirable along the bottom of the float to protect the float when the aircraft is beached and a girder member is fastened into the float at its top side to furnish a support for the aircraft. It is to be understood, however, that they can be made from many other materials, for example, molded rubber, synthetic materials, such as synthetic resins or synthetic rubber, or even fabrics that are not rubberized, but are for some other reason impervious to air.

At first this girder member was a flat frame made of alloy tubing but it has now been found that a girder of triangular cross-section provides greater strength with less waste. At first also it was thought desirable to have the frame member extend practically the full length of the float but this also has been found unnecessary and hence the girder has been considerably shortened. It is possible and may in some instances be desirable to use a saddle member covering the upper part of the float instead of a girder imbedded therein.

The deflecting ridges around the float are preferably formed by inflatable rubberized fabric tubes which extend from a point above the water line at the front end of the float, in a curved line to a point somewhat below the water line on each side of the float. In the case of shortened floats such as those used in a three float landing gear for hydroplanes it has been found desirable to extend the deflecting ridges all the way around the rear end of the float so that water which rises behind the float as it moves along will also be deflected downwardly and not thrown upward in back of the float. The deflecting ridges, however, need not necessarily be inflatable tubes but can be of any suitable form and material that will perform the necessary deflecting action. It is desirable, but not absolutely essential that they form with the float body an elongated, inverted V-shaped groove that will carry air back under the float when the aircraft is in motion, for the air so carried aids in breaking the suction between the float and the water. The spray tubes may be in the form of a molded rubber strip.

A more thorough understanding of the details and further advantages of the new flotation gear will be readily understood by consideration of the following detailed description of several embodiments of the flotation gear.

Figure 1 is a perspective view of the new flotation gear attached in the manner of ordinary rigid floats to a small airplane;

Figure 2 is a longitudinal sectional view of one of the floats of Figure 1;

Figure 3 is a transverse sectional view of one of the floats of Figure 1 taken on line 3—3 of Figure 2;

Figure 4 is a plan view of the girder member of one of the floats of Figure 1;

Figure 5 is a transverse sectional view of a modification of one of the floats of Figure 1;

Figure 6 is a perspective view of the triangular girder used in the float of Figure 5;

Figure 7 is a longitudinal view of the modification shown in Figure 5;

Figure 8 is a further modification of one of the floats shown in Figure 1 in which the dividing partitions run lengthwise;

Figure 9 is a transverse sectional view of the float shown in Figure 8 taken on line 9—9 of Figure 8;

Figure 10 is a transverse sectional view of still another modification of the float of Figure 1 which modification is particularly adapted for use with relatively large aircraft.

Figure 11 is a perspective view of a small airplane equipped with two main floats in place of wheels and with a small tail float in place of a tail wheel;

Figure 12 is a rear view of one of the main floats shown in Figure 11;

Figure 13 is a front view of a small airplane equipped for amphibian flying with both floats and wheels;

Figure 14 is a partial view of the same airplane with the floats in operative position and the wheels retracted;

Figures 15, 16 and 17 are detailed views showing the manner in which the partitions in Figure 2 are made;

Figure 18 is a front view of a large flying boat type of airplane using a main float and wing tip floats according to the present invention;

Figure 19 is a longitudinal sectional view of the airplane of Figure 18; and

Figure 20 is a transverse sectional view of the airplane of Figure 18.

As shown in Figures 1 to 4, inclusive, the new floats may be provided in a form satisfactory for converting ordinary land airplanes into hydroplanes. Thus a small land airplane 31 may be attached by the usual strut arrangement 32 to a pair of elongated pneumatic floats 33 each carrying a pair of spray tubes or deflecting ridges 34 which extend from a point above the water line at the forward tip of the boat to a point somewhat below the water line about half way back on the side of the float. Following the usual practice with rigid floats these pneumatic floats may have a step 35 about half way back to aid in breaking the suction that commonly exists between the water and the float when the aircraft is in the act of taking off. The floats proper may consist of a cigar shaped rubberized fabric bag 36.

This bag may be attached to a girder member 37 by first covering the girder member 37 with a rubberized fabric cover 38 laced in place by laces 39. To this rubberized fabric cover 38 there may then be cemented a rubberized strip 40 which is reinforced at its free edge 41. This strip is attached so that it extends around the girder 37 and provides a free edge to which the bag 36 may eventually be attached. A similar sheet of rubberized fabric 42 may be attached to the rubberized fabric bag 36 and arranged to match the free edge of the strip 40 on the girder. This strip is also reinforced at the matching edge 43. The two edges may then be laced together by lacing 44 so that the bag is held tightly in place. These lacing may then be protected by a covering strip 45 which is simply cemented to the bag at one edge and to the girder cover at the other.

The result is a smooth outside surface which has little wind resistance and provides no recesses to catch water, dirt, grease or the like. The girder 37 is provided with bolts 46 which extend through the fabric cover 38 so that the float may be readily attached to the strut 32.

The spray tubes or deflecting ridges 34 are customarily rubberized fabric tubes cemented in place on the main bag 36. A heavy rubber breaker strip 48 is usually provided along the bottom of the main bag 36 and partitions 49 are positioned within the bag to prevent total deflation should a puncture occur in one of the compartments. Valves 47 and 47' may be provided in the side of each float leading to each compartment and at the rear end of the spray tube respectively so that they can be inflated to the desired pressure.

The partitions may conveniently be made as shown in Figures 15, 16 and 17 by cutting two or more pieces of rubberized fabric and cementing them together so that they form a cone or dome-shaped partition 50 which may then be cemented in place inside of the main bag. As shown in Figure 2 in cementing this partition in place it has been found desirable to first attach a strip of fabric 52 to the partition near the edge, spread the edges of the partition and the attached strip and cover the spread edges with a second strip of fabric 51 which is then cemented to the bag proper. By this procedure the partition can be cemented in place quite firmly with little possibility that it will ever tear loose. To still further hold the partition in place a pair of additional strips of fabric 53 and 54 may be cemented on the inside of the bag in such a position that they cover the edges of the partition and fastening strip 51.

The thickness of the fabric parts is shown greatly exaggerated in Figure 2 of the drawings in order to show the arrangement. Obviously, the fabric as shown is far too thick with relation to the size of the pontoons. Dotted lines 55 and 56 show the position which the partition will assume should the compartment on one side or the other of the partition be deflated.

In the earlier models of the new flotation gear the frame or girder which comprises the only rigid part of the float consisted of a flat member made up of alloy tubing as shown in Figure 4. In later models, however, this has been modified somewhat and it has now been found advantageous because of lesser weight and because of greater structural strength to use a girder 57 such as is shown in Figure 6 of the drawings. This girder may be made of any of the usual structural alloys and either welded or riveted together. It comprises essentially three elongated pieces of metal put together so that they will have a triangular cross-section. Bolts 58 are provided for the attachment of the necessary struts.

As can be seen in Figure 5 the new girder is built into the float by making the float with a concavity in its top surface, placing the girder in the concavity, attaching two strips of rubberized fabric 59 and 60 to the float in such a manner that they will fold over the girder when in place and then sealing these two strips of rubberized fabric together with a third strip of rubberized fabric 61. With such a construction the girder can be removed for examination without completely disassembling the float and the fabric part of the float can be completely manufactured before assembling it onto the girder.

In Figures 8 and 9 a modification of the float of Figures 5, 6 and 7 is shown in which modification the partitions that separate the various air compartments extend lengthwise. Thus there are partitions 62, 63 and 64 which separate the float into four longitudinally extending compartments. The partitions are attached in much the same manner as those in Figures 1 to 3. The longitudinally extending compartments, however, have some advantage in that if one compartment should become deflated the effect is distributed over the whole length of the pontoon rather than affecting only one particular section. Furthermore, if it is desired to deflate the pontoons to decrease their wind resistance, air can be withdrawn from one or more of the longitudinal compartments and cause a reduction in the frontal area of the pontoons without collapsing the pontoons longitudinally.

A cross-section of a similar float manufactured by making two long, narrow pontoons then binding them together with rubberized fabric is shown in Figure 10. The two pontoons 64' and 65 are manufactured separately and then fastened tightly together by rubberized fabric strips 66 and 67. The lower rubberized fabric strip may be replaced by a heavy rubber breaker strip if desired in order to protect the bottom of the float.

It has also been discovered to be feasible to use three pontoons on aircraft instead of two as has been the usual custom prior to this time. To that end a pair of floats somewhat shorter than usual may be attached to the under-carriage of the conventional land type airplane as shown in Figure 11 and a small float attached to the structure that originally supported the tail wheel. Thus a small airplane 68 with wheel supporting strut 69 and a tail wheel carrying structure 70 may be converted into a seaplane by attaching a pair of short floats 71 to the wheel supporting struts, adding a pair of links 72 to prevent the floats from rocking on the supporting strut and mounting a tail float 73 on the tail wheel supporting structure 70. The short floats used in front are similar to the floats shown in Figures 5, 6 and 7 except that the portion aft of the step has been eliminated. In its place these floats have a deflecting ridge or spray tube 74 across the rear and a little above the water line. The tail float 73 is similar to the other floats except that it has no step and carries a saddle plate 75 which is formed integrally with the float by cementing the top layers of fabric over it and this saddle plate is connected to the tail wheel supporting structure of the ship. The usual tail wheel steering mechanism 77 can be used to steer the tail float just as it steers the tail wheel when the airplane is used on the ground.

As shown in Figures 13 and 14, an amphibious type of gear may be installed on an airplane by mounting both a float 78 and a wheel 79 on each of a pair of landing gear struts 80 so that by pivoting arms on these struts either the floats or the wheels can be brought into operative position. The means for pivoting these arms are not shown or described in this application but can be any means that will accomplish this function. In Figure 13 the wheels are shown in the operative position and in Figure 14 the wheels are lifted so that they will not strike the water.

For use on a flying boat, the float may take any one of a number of different forms and an attempt is made here only to illustrate one possible form that the float may take. It is not intended, however, that the scope of this application be limited to any particular form but the form shown in Figures 18, 19 and 20 will illustrate the general principle involved.

As shown in these figures a large float 81 is secured to the bottom of a flying boat, a tail float 82 is attached near the tail and wing-tip floats 83 are attached to each wing. The tail float and the wing-tip floats are of the same construction as has been illustrated in Figures 1 to 10 inclusive but need have no step for there is no problem in separating them from the water. The main float in 81 is also generally similar to the floats shown in the first ten figures but preferably does have a step and doubtless will be quite different in details of construction since it is necessary to make it fit the particular flying boat for which it is designed. In general, however, the bottom of the flying boat will be concave so as to hold the float securely and rubberized fabric 84 from the edges of the float will extend up over the framework of the boat to hold the float in position. The wing-tip and tail floats may be made retractable if desired and suitable equipment may be provided to deflate them and the main float when the ship is in the air and to inflate them again before landing.

In general it has been found that with ships of less than four thousand pounds gross weight one to two pounds air pressure is sufficient to maintain the floats in expanded position when the airplane is resting on them on the water. As the airplane goes higher into the air the differential pressure between the inside of the floats and the outside air of course increases and hence means must either be provided to reduce the air pressure within the float or the floats must be made strong enough to stand the additional pressure without exploding. At altitudes up to twelve to fifteen thousand feet the floats will normally be strong enough to safely hold the pressure. For high altitudes escape valves and pumps may be provided to reduce the pressure in the floats as the airplane ascends and raise the pressure again when the airplane descends. In view of the low pressure in the floats air scoops may be used to supply pressure to them at low altitudes and escape valves may be used which operate automatically to release the pressure at higher altitudes. If it is desired that the floats collapse into a smaller space after the airplane is in flight the construction may be modified by providing springs or elastic means to make the floats collapse in the desired manner so as to occupy the least possible space when the air is released from them. For example several elastic cables may be placed around the inside of each of the floats so that upon deflation they will immediately contract into a relatively small bundle that can be readily stored in a recess in a wing or will present very little wind resistance even if exposed. Obviously, the compartments of the float may all be connected through suitable check valves to a common manifold so that all may be inflated simultaneously and the pressure therein automatically equalized.

This application is a continuation-in-part of application Serial No. 215,900, filed June 25, 1938, now abandoned.

I claim:

1. A float for aircraft or the like that comprises a non-rigid inflatable bag having a non-rigid lower surface, means to support an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface.

2. A float for aircraft or the like that comprises a non-rigid inflatable bag having a non-rigid lower surface, means comprising an elongated frame to support an aircraft or the like from the upper side of said bag and lend longitudinal strength thereto and means fixed to said bag and extending into the path of the water that will be expelled sideways from under said bag when in motion on water, said means being so placed that the force of said water thereon will tend to lift said bag and stretch the bottom thereof into a flat surface.

3. A float for aircraft or the like that comprises a generally cigar shaped non-rigid inflatable bag having a non-rigid lower surface, means to support an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface.

4. A float for aircraft or the like that comprises a generally hull shaped non-rigid inflatable bag having a non-rigid lower surface, means to support an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface.

5. A float for aircraft or the like that comprises a non-rigid inflatable bag having a non-rigid lower surface and including a series of separately inflatable compartments, means to support an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface.

6. A float for aircraft or the like that comprises a non-rigid inflatable bag having a non-rigid lower surface and including a series of separately inflatable compartments extending laterally across the bag, means to support an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface.

7. A float for aircraft or the like that comprises a non-rigid inflatable bag having a non-rigid lower surface and including a series of separately inflatable compartments extending longitudinally of the bag, means to support an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface.

8. A float for aircraft or the like that comprises a non-rigid inflatable bag having a non-rigid lower surface, means to support an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface, said means comprising a deflecting fin extending from above the water line at the forward end of the float longitudinally alongside of the float to a somewhat lower level.

9. A float for aircraft or the like that comprises a non-rigid inflatable bag having a non-rigid lower surface, means to support an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface, said means comprising a deflecting fin extending from above the water line at the forward end of the float longitudinally alongside of the float to a somewhat lower level below the water line.

10. A float for aircraft or the like that comprises a non-rigid inflatable bag having a non-rigid lower surface, means to support an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface, said means comprising an inflatable non-rigid tube extending from above the water line at the forward end of the float longitudinally along each side of the float to a somewhat lower level well back on the side of the float.

11. A float for aircraft or the like that comprises a non-rigid inflatable bag having a non-rigid lower surface, means to support an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface, said means comprising an inflatable non-rigid tube extending from above the water line at the forward end of the float longitudinally along each side of the float to a somewhat lower level below the water line well back on the side of the float.

12. A wing tip float for aircraft or the like that comprises a non-rigid inflatable bag having a non-rigid lower surface, means to support the wing tip of an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface.

13. A stepless float for aircraft or the like that comprises a generally cigar shaped non-rigid inflatable bag having a non-rigid lower surface, means to support an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface.

14. A stepped float for aircraft or the like that comprises a generally cigar shaped non-rigid inflatable bag having a non-rigid lower surface and having a relatively sharp diameter change at one point between its ends, means to support an aircraft or the like from the upper side of said bag and means fixed to said bag and extending into the path of the water that will be expelled sideways from under said bag when in motion on water, said means being so placed that the force of said water thereon will tend to lift said bag and stretch the bottom thereof into a flat surface.

15. A pontoon for aircraft having a rubber fabric wall which is flexible but non-extensible so that a few pounds of air pressure holds its shape, and including a relatively large front section, a relatively small rear section, a bottom step at the joining of the sections, said rear section tapering to a fraction of its size at the rear end, and an elastic tube spray board on each side of the pontoon projecting outwardly and extending from above the water line near the front of the front section to well below the water line near the step.

16. A pontoon for aircraft comprising an inflatable hollow body formed of airtight and waterproof fabric and having a desired degree of buoyancy on water, said body being characterized by a rigidly reinforced upper wall and a wholly flexible bottom merging with wholly flexible side walls, said bottom and side walls being normally convex in cross-section and expanding from the front to near the center and then tapering rearwardly to provide a reduced cross-sectional area, and said bottom being further characterized by a transverse step intermediate its ends to facilitate planing and take-off, and spray deflectors projecting laterally from the opposite sides of the hollow body substantially defining the zones of merger of the side walls and the bottom walls, said spray elements being gradually curved from adjacent the upper part of the front or bow of the pontoon to terminals adjacent said transverse step.

17. A pontoon for aircraft including a flexible waterproof and airtight fabric inflatable by air at a few pounds pressure to form an elongated body floating in water, said body having a nearly circular cross-section, a rigid top frame forming the sole non-flexible member in the pontoon so that air pressure within and water pressure and flow outside the fabric substantially determine the shape of the inflated body where in contact with the water, and a flexible spray deflector on each side of the pontoon springing from the front elgonated end well above the water line and extending backwardly and downwardly toward the middle along each side and terminating in the neighborhood of the waterline.

18. A pontoon for aircraft including a flexible, waterproof and airtight fabric inflatable by air at a few pounds pressure to form an elongated hollow body floating in water, said body having a relatively large nearly circular cross-section forward of the center, also having a relatively small nearly circular cross-section aft of the center, a bottom fabric transverse step joining the large and small cross-section parts, and a flat rigid frame wholly attached to the fabric at the top and forming the sole non-flexible member in the pontoon so that air pressure within and water pressure and flow outside the fabric substantially determine the shape of the inflated body where in contact with the water, and a relatively small inflated hollow tube fabric spray deflector attached to each side of the pontoon springing from the front elongated end well above the water line and extending backwardly and downwardly toward the step and terminating in the neighborhood of the water line and inflated at very low pressures.

19. A pontoon for aircraft including flexible waterproof and airtight fabric inflatable by air at a few pounds pressure to form an elongated body floating in water, said body having a nearly circular cross-section, a rigid top frame stretching the top of the fabric nearly flat and forming the sole non-flexible member in the pontoon so that air pressure within and water pressure and flow outside the fabric substantially determine the shape of the inflated body where in contact with the water, and a flexible spray deflector on each side of the pontoon springing from the front elongated end well above the water line and extending backwardly and downwardly toward the middle along each side and terminating in the neighborhood of the water line.

20. A pontoon for aircraft including a flexible waterproof and airtight fabric inflatable by air at a few pounds pressure to form an elongated body floating in water, said body having a nearly circular cross-section, a rigid top frame stretching the top of the fabric nearly flat and forming the sole non-flexible member in the pontoon so that air pressure within and water pressure and flow outside the fabric substantially determine the shape of the inflated body where in contact with the water, and a relatively small flexible tube spray deflector on each side of the pontoon springing from the front elongated end well above the water line and extending backwardly and downwardly toward the middle along each side and terminating in the neighborhood of the water line and inflated at low pressure, and devices on the frame adapted to hold the pontoon to an aircraft structure.

21. A pontoon for aircraft having a rubber fabric wall which is flexible but non-extensible so that a few pounds of air pressure holds its shape, and including a relatively large front section, a relatively small rear section, a bottom step at the joining of the sections, said rear section tapering to a fraction of its size at the rear end, an elastic tube spray board on each side of the pontoon projecting outwardly and extending from above the water line near the front of the front section to well below the water line near the heel, and a rigid frame for the top of the pontoon including members lying near its outer edge, and adapted to engage struts of the aircraft structure.

ASHLEY C. McKINLEY.